Aug. 19, 1924.
J. M. KUSSMAUL
1,505,353
CAGE TRAP
Filed June 14, 1921
Fig. 1.
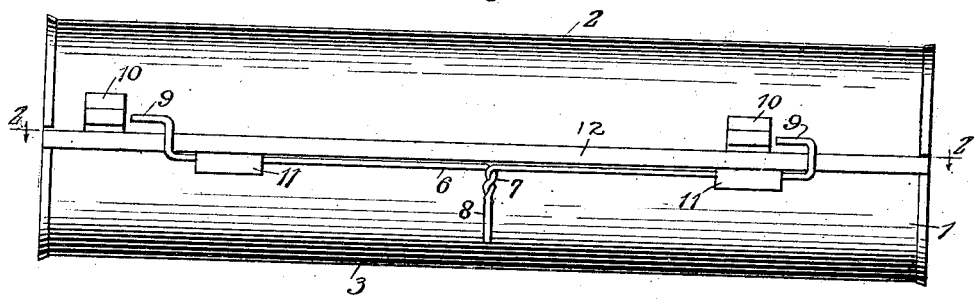
Fig. 2.
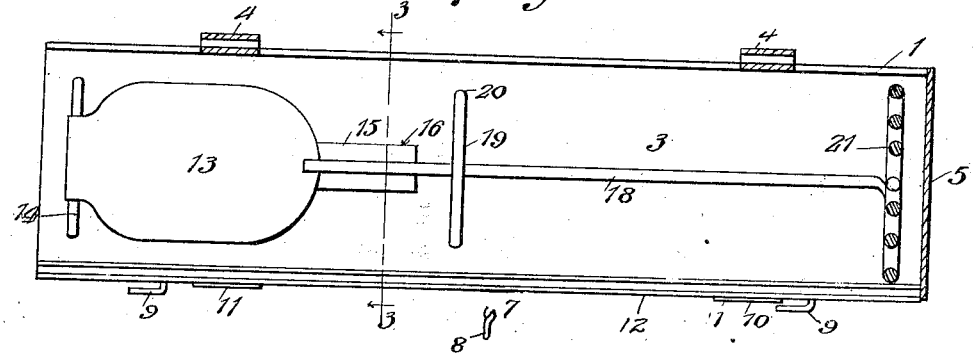
Fig. 3.　　Fig. 5.
Fig. 4.
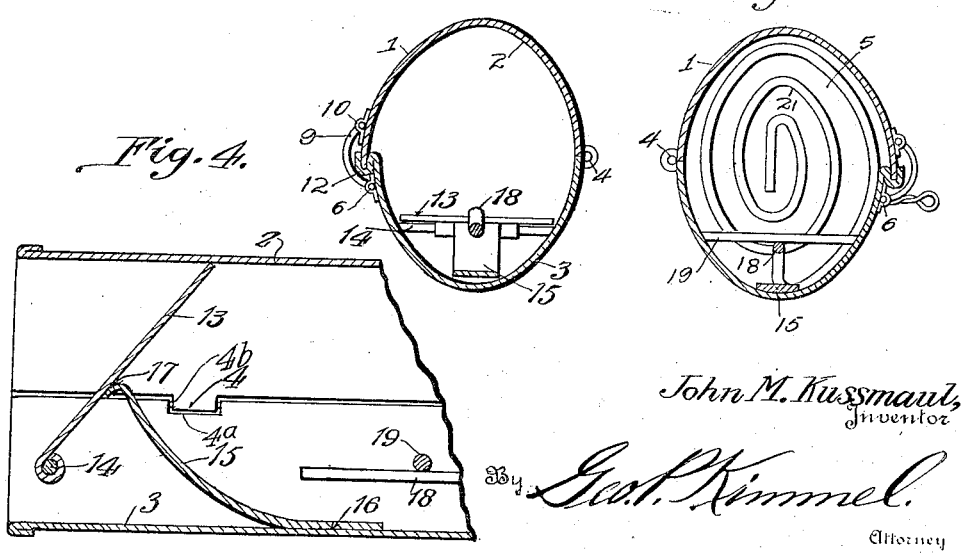
John M. Kussmaul, Inventor
By Geo. P. Kimmel
Attorney Patented Aug. 19, 1924.

1,505,353

UNITED STATES PATENT OFFICE.

JOHN MARTIN KUSSMAUL, OF CARBONDALE, ILLINOIS.

CAGE TRAP.

Application filed June 14, 1921. Serial No. 477,440.

*To all whom it may concern:*

Be it known that I, JOHN MARTIN KUSSMAUL, a citizen of the United States, residing at Carbondale, in the county of Jackson and State of Illinois, have invented certain new and useful Improvements in Cage Traps, of which the following is a specification.

The present invention relates to new and useful improvements in cage traps and has for its primary object the provision of a trap of the class described which is simple in construction, strong and durable and cheap to manufacture.

Another object of the invention is to provide a trap of the class described which may be placed in a convenient position to permit the entrance of the animal to be trapped, the trap being so constructed that the setting operation may be performed without danger to the operator.

A further object of my invention is to provide a trap of the class described which captures an animal without injury to the same, the trap being particularly adapted for capturing moles, rats, and the like, the device being of a shape permitting its insertion into the opening from which the animal comes whereby the animal will be caused to pass into the trap. I also provide improved bait holding means which permit the animal to reach the bait distracting its attention from the operating mechanism of the device whereby to permit closing of the door.

Other objects and advantages to be derived from the use of my improved trap will appear from the following detail description and the claim, taken with an inspection of the accompanying drawings, in which:

Figure 1 is a side elevational view of a trap embodying the improvements of my invention.

Figure 2 is a longitudinal sectional view taken on the line 2—2 of Figure 1.

Figure 3 is a transverse sectional view taken on the line 3—3 of Figure 2, looking in the direction of the arrow; and Figure 4 is a vertical longitudinal fragmentary sectional view of my improved trap showing the catching mechanism in released position.

Figure 5 is a view similar to Figure 3, but viewed in the same plane as line 3—3 of Figure 2 and in opposition to the arrows.

Referring more particularly to the drawings wherein similar characters of reference designate like and corresponding parts throughout the various views, 1 designates the body of my improved trap in its entirety, said body being formed of an upper and lower longitudinal sections 2 and 3 the lower section 3 having one longitudinal marginal portion bent outwardly in overlapping relation to provide a groove flange 12 and the other longitudinal marginal portion being provided with recesses 4ª. The section 3 is provided with an end wall 5 to purposely close one end of the trap. I provide means for locking the sections 2 and 3 in closed positions, said means including a shiftable bar 6 formed of suitable material and twisted at 7 to form a loop 8 providing a handle, the free end of the bar 6 being formed with catch members 9 for engagement in catches 10 carried by the section 2. The bar 6 is slidably mounted in bearing members 11 carried by the lower section 3. The flange 12 is adapted to receive the free marginal end of the section 2 as best shown in Figure 3.

The section 2 is formed along one marginal edge with hinged knuckles 4 which are positioned in recesses 4ª and secured therein by the pivot pins 4ᵇ, which pins are secured between the opposed edges of the recesses.

The trapping mechanism of my invention includes preferably a closure member 13 hinged on a rod 14 extending transversely of the section 3. The trap spring element 15 secured at 16 to the section 3 is normally in tensional engagement with the under surface of the closure member 13 as indicated at 17 in Figure 4.

The setting mechanism of my invention includes a closure engaging member formed of a strand of heavy wire designated 18, the free end of said strand being engaged with the closure member and the intermediate portion of the strand being engaged under a transverse bar 19 secured at 20 to the section 3. As best shown in Figure 4, the bar 19 is slightly spaced from the bottom of the section 3 for an obvious purpose. The rear end of the strand 18 is formed as an actuating member by coiling this strand spirally forming a movable member 21, convolutions of which permit the bait to be mounted on the member 21, between the wall 5, and said member 21.

The trap is shown set in Figures 2 and 3, and it will be seen that when an animal enters over the closure member 13 and proceeds for the bait, the said animal is not hindered by any doors or other pivoted devices which must be moved by the animal before access can be had to the trap. When the animal attacks the bait the member 21 will be moved disengaging the free end of the strand 18 from the closure member and permitting the latter to close under the action of the spring 15. The trap is shown sprung in Figure 4 and it will be noted that when in this position, an animal contained in the trap is prevented from escaping without injury or killing of the animal. To remove the animal from the trap, the same is opened by swinging apart the sections 2 and 3 on the hinges 4 allowing the animal to escape either into a cage or to be killed by a dog or the like when the animal is a rat or the like.

Primarily, the trap in its construction is designed for use in trapping moles, yet it is to be understood that the construction of the trap can be amplified or varied in size to adapt the same for the trapping of different sizes or species of animals, either the smaller or larger kind.

From the above description taken in connection with the accompanying drawings, it is thought that a clear and comprehensive understanding of the construction, operation, and advantages of my invention may be had, and while I have shown and described my invention as embodying a specific structure, I desire that it be understood that I may make such changes in said structure as do not depart from the spirit and scope of the invention as described.

Having thus fully described my invention, what I claim as new and desire to secure by Letters Patent, is:—

In a trap of the character described, a tubular body constituting a trapping compartment formed of an upper and lower longitudinal section, said lower section having one longitudinal marginal portion thereof bent outwardly in overlapping relation to provide a grooved flange, and the other longitudinal marginal portion formed with recesses, hinge knuckles formed along one longitudinal edge of said upper section and positioned in said recesses, pivot means for securing said knuckles in said recesses, the other longitudinal edge of said upper section fitting in the groove of said flange to form a positive connection between the two sections, catches carried exteriorly upon the upper section, a shiftable bar carried by said lower section having a plurality of engaging fingers for simultaneously engaging said catches upon actuation of the bar, and an end wall common to both sections and carried by one of said sections.

In testimony whereof, I affix my hand hereto.

JOHN MARTIN KUSSMAUL.